(12) United States Patent
Peterson et al.

(10) Patent No.: US 10,359,844 B2
(45) Date of Patent: Jul. 23, 2019

(54) RESIZING INTERFACES BASED ON EYE GAZE

(71) Applicant: LENOVO (Singapore) PTE. LTD., New Tech Park (SG)

(72) Inventors: Nathan J. Peterson, Oxford, NC (US); Jennifer Lee-Baron, Morrisville, NC (US); John Scott Crowe, Durham, NC (US); Gary David Cudak, Wake Forest, NC (US); Amy Leigh Rose, Chapel Hill, NC (US); Bryan Loyd Young, Tualatin, OR (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 8 days.

(21) Appl. No.: 15/469,347

(22) Filed: Mar. 24, 2017

(65) Prior Publication Data

US 2018/0275752 A1    Sep. 27, 2018

(51) Int. Cl.
*G06F 3/01* (2006.01)
*G06F 3/0484* (2013.01)

(52) U.S. Cl.
CPC .......... *G06F 3/013* (2013.01); *G06F 3/04845* (2013.01); *G06F 2203/04803* (2013.01)

(58) Field of Classification Search
CPC ...................................................... G09G 5/00
See application file for complete search history.

(56) References Cited

U.S. PATENT DOCUMENTS

| | | | |
|---|---|---|---|
| 9,690,400 B2 * | 6/2017 | Krishnakumar | .... G06F 3/03547 |
| 2012/0188148 A1 * | 7/2012 | DeJong | .............. G02B 27/0093 345/8 |
| 2016/0313816 A1 * | 10/2016 | Krishnakumar | .... G06F 3/03547 |
| 2016/0357358 A1 * | 12/2016 | Forster | .................. G06F 3/0481 |

* cited by examiner

*Primary Examiner* — Olga V Merkoulova
(74) *Attorney, Agent, or Firm* — Kunzler Bean & Adamson

(57) ABSTRACT

Apparatuses, methods, systems, and program products are disclosed for resizing interfaces based on eye gaze. A method includes tracking a user's eye gaze using an eye tracking sensor, determining, by a processor, that the user is looking at a pane of a multipane interface based on the user's eye gaze, and dynamically resizing the pane that the user is looking at in response to determining that the user is looking at the pane.

20 Claims, 5 Drawing Sheets

RESIZING INTERFACES BASED ON EYE GAZE

FIELD

The subject matter disclosed herein relates to eye tracking and more particularly relates to resizing interfaces based on where a user is looking.

BACKGROUND

Applications may have graphical interfaces that include multiple different viewing areas, or panes, that can display various types of content simultaneously. Some applications allow users to manually resize the panes to be larger or smaller, for example, by dragging a pane boundary with a cursor. It may be cumbersome, however, for the user to manually resize panes.

BRIEF SUMMARY

An apparatus for resizing interfaces based on eye gaze is disclosed. A method and computer program product also perform the functions of the apparatus. In one embodiment, an apparatus includes an eye tracking sensor, a processor, and a memory that stores code executable by the processor. In certain embodiments, the code is executable by the processor to track a user's eye gaze using the eye tracking sensor. In a further embodiment, the code is executable by the processor to determine that the user is looking at a pane of a multipane interface based on the user's eye gaze. In some embodiments, the code is executable by the processor to dynamically resize the pane that the user is looking at in response to determining that the user is looking at the pane.

In one embodiment, the code is further executable by the processor to dynamically resize the pane by enlarging a viewing area of the pane within the viewing area of the multipane interface. In some embodiments, the code is further executable by the processor to enlarge the viewing area of the pane by increasing a width of the pane. In various embodiments, the code is further executable by the processor to enlarge the viewing area of the pane by increasing a height of the pane.

In one embodiment, the code is further executable by the processor to enlarge the viewing area of the pane by increasing a geometric area of the viewing area of the pane. In a further embodiment, the code is further executable by the processor to enlarge the viewing area of the pane by an amount determined as a function of the viewing area allocated to the multipane interface.

In some embodiments, the code is further executable by the processor to enlarge the viewing area of the pane by one or more of a percentage of the allocated viewing area, a ratio of the allocated viewing area to a size of a display presenting the multipane interface, and a factor of the allocated viewing area. In certain embodiments, the code is further executable by the processor to detect the user's eye gaze move from the pane to a second pane of the multipane interface and dynamically resize the second pane in response to detecting the user's eye gaze move from the first pane to the second pane.

In various embodiments, the code is further executable by the processor to dynamically reduce a viewing area of the pane in response to detecting the user's eye gaze move from the pane to the second pane. In one embodiment, the code is further executable by the processor to start a timer in response to determining that the user is looking at the pane, wherein expiration of the timer triggers the dynamic resizing of the pane. In one embodiment, the code is further executable by the processor to reset the timer in response to detecting the user's eye gaze move from the pane to a second pane prior to expiration of the timer.

In one embodiment, the multipane interface comprises an operating system interface where each pane of the operating system interface comprises an interface for an application executing within the operating system.

A method, in one embodiment, includes tracking a user's eye gaze using an eye tracking sensor. In a further embodiment, the method includes determining, by a processor, that the user is looking at a pane of a multipane interface based on the user's eye gaze. In some embodiments, the method includes dynamically resizing the pane that the user is looking at in response to determining that the user is looking at the pane.

In one embodiment, the method includes dynamically resizing the pane by enlarging a viewing area of the pane within the viewing area of the multipane interface. In a further embodiment, the method includes enlarging the viewing area of the pane by increasing one of a width, a height, and a geometric area of the viewing area of the pane.

In various embodiments, the method includes detecting the user's eye gaze move from the pane to a second pane of the multipane interface and dynamically resizing the second pane in response to detecting the user's eye gaze move from the first pane to the second pane. In some embodiments, the method includes dynamically reducing a viewing area of the pane in response to detecting the user's eye gaze move from the first pane to the second pane.

In some embodiments, the method includes starting a timer in response to determining that the user is looking at the pane, wherein expiration of the timer triggers the dynamic resizing of the pane. In a further embodiment, the multipane interface comprises an operating system interface where each pane of the operating system interface comprises an interface for an application executing within the operating system.

A program product, in one embodiment, includes a computer readable storage medium that stores code executable by a processor. In some embodiments, the executable code includes code to perform tracking a user's eye gaze using an eye tracking sensor. In a further embodiment, the executable code includes code to perform determining that the user is looking at a pane of a multipane interface based on the user's eye gaze. In certain embodiments, the executable code includes code to perform dynamically resizing the pane that the user is looking at in response to determining that the user is looking at the pane.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
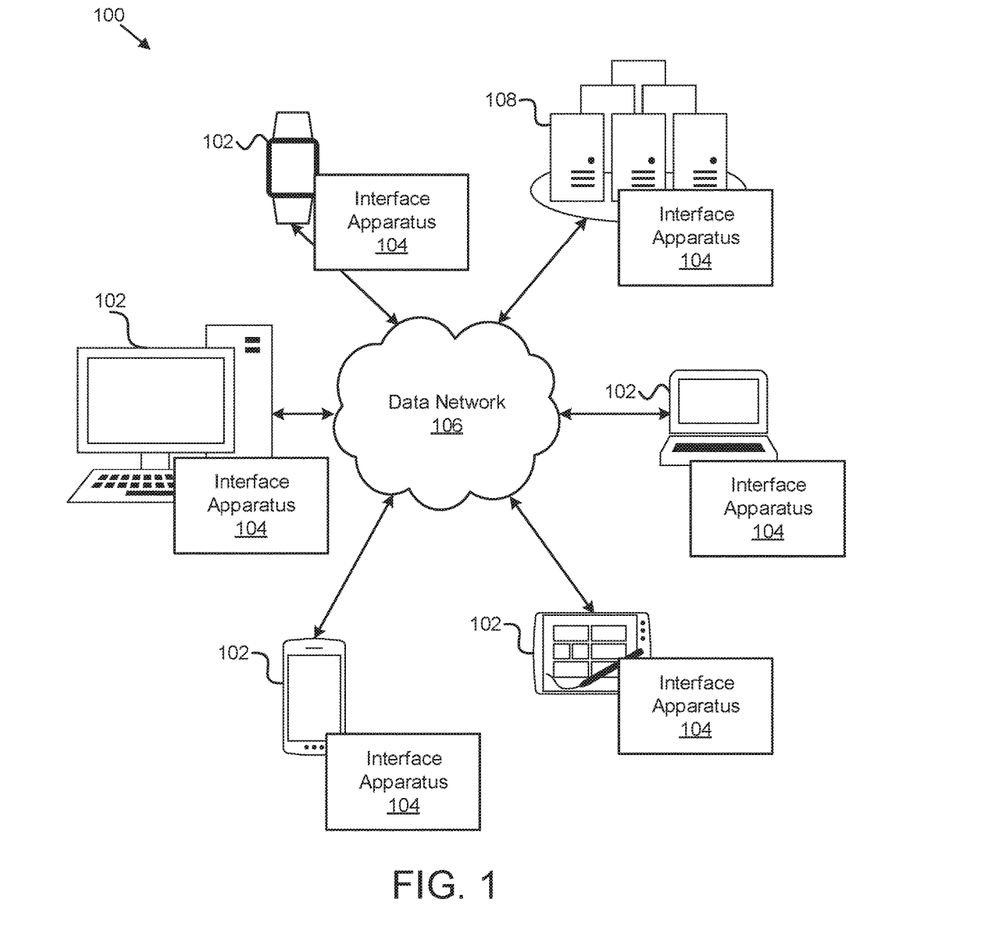
FIG. 1 is a schematic block diagram illustrating one embodiment of a system for resizing interfaces based on eye gaze.

FIG. 1 is a schematic block diagram illustrating one embodiment of a system 100 for resizing interfaces based on eye gaze. In one embodiment, the system 100 includes one or more information handling devices 102, one or more interface apparatuses 104, one or more data networks 106, and one or more servers 108. In certain embodiments, even though a specific number of information handling devices 102, interface apparatuses 104, data networks 106, and servers 108 are depicted in FIG. 1, one of skill in the art will recognize, in light of this disclosure, that any number of information handling devices 102, interface apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, are configured to execute various programs, program code, applications, instructions, functions, and/or the like, which may access, store, download, upload, and/or the like data located on one or more servers 108. The information handling devices 102 may include one or more sensors for tracking users' eye gaze, e.g., a camera, and/or the like.

In one embodiment, the interface apparatus 104 is configured to track a user's eye gaze, determine whether the user is looking a pane of an application's interface, and resize the interface pane that the user is looking at. For example, if the interface apparatus 104 determines that the user is looking at a navigation pane of file explorer interface, the interface apparatus 104 may dynamically make the navigation pane larger so that the content within the pane is easier to view. The interface apparatus 104, including its various sub-modules, may be located on one or more information handling devices 102 in the system 100, one or more servers 108, one or more network devices, one or more security systems, and/or the like. The interface apparatus 104 is described in more detail below with reference to FIGS. 2 and 3.

In one embodiment, the interface apparatus 104 solves a technical problem of manually resizing interface panes, and improves the usability of devices, applications, operating systems, or the like by automatically, without user intervention, resizing interface panes that the interface apparatus 104 determines the user is looking at. Without the solution disclosed herein, users would need to manually resize interface panes, which may require a user to move their hands from a keyboard to a mouse, to move a cursor to a pane boundary and drag the boundary, and/or to perform other actions that can be cumbersome, especially if being performed regularly.

In various embodiments, the interface apparatus 104 may be embodied as a hardware appliance that can be installed or deployed on an information handling device 102, on a server 108, or elsewhere on the data network 106. In certain embodiments, the interface apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the interface apparatus 104 may include a power interface, a wired and/or wireless network interface, a graphical interface that attaches to a display, and/or a semiconductor integrated circuit device as described below, configured to perform the functions described herein with regard to the interface apparatus 104.

The interface apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the interface apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the interface apparatus 104.

The semiconductor integrated circuit device or other hardware appliance of the interface apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the interface apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a Bluetooth® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102, with a user, and/or the like.

Figure 2:
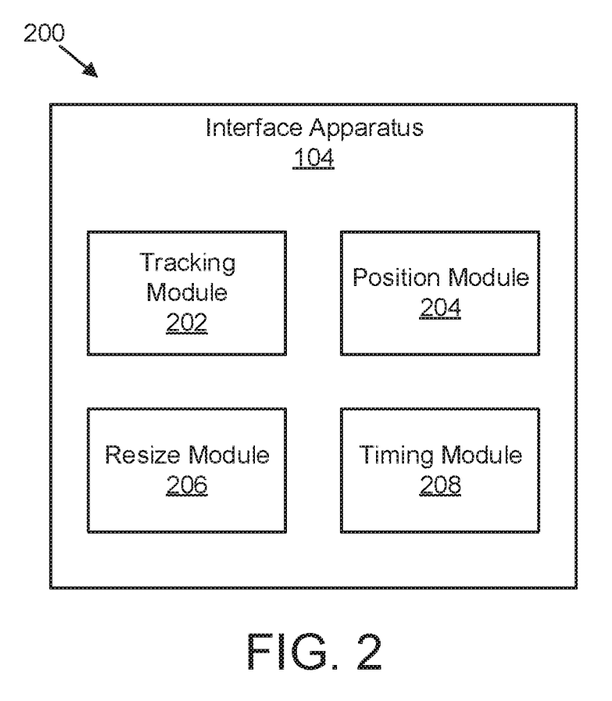
FIG. 2 is a schematic block diagram illustrating one embodiment of an apparatus for resizing interfaces based on eye gaze.

FIG. 2 is a schematic block diagram illustrating one embodiment of an apparatus 200 for resizing interfaces based on eye gaze. In one embodiment, the apparatus 200 includes an embodiment of an interface apparatus 104. The interface apparatus 104, in some embodiments, includes one or more of a tracking module 202, a position module 204, a resize module 206, and a timing module 208, which are described in more detail below.

The tracking module 202, in one embodiment, is configured to track a user's eye gaze using an eye tracking sensor. The eye tracking sensor may include a camera, e.g., a digital camera, an infrared camera, or the like. The eye tracking sensor may be integrated into, or otherwise operably connected to a device. In certain embodiments, the tracking module 202 may track the user's eye gaze by taking images of the user's eyes in response to the user's eyes moving. Thus, as the user looks around at content presented on a display, the tracking module 202 may constantly receive input from the eye tracking sensor.

The position module 204, in one embodiment, processes the input from the eye tracking sensor, such as images of the user's eyes, and determines the position on the display where the user is looking. For instance, the position module 204 may perform various image processing and pattern recognition methods to determine where the user is looking in relation to the boundaries of a display, a viewing area of an interface, and/or the like.

The position module 204 may determine display coordinates for the position on the display where the user is looking based on the user's eye gaze that the tracking module 202 detects. For instance, based on the user's gaze, the position module 204 may determine an x,y coordinate that indicates a position on a display or within a viewing area of an interface where the user is looking.

In certain embodiments, the position module 204 determines whether the use is looking at a pane within an interface presented on a display based on the determined location where the user is looking in on the display. As used herein, an interface pane includes a frame, view, window, or the like that separates content that is presented within an application's interface. For example, an email application may be a multipane application that includes a pane that displays a listing of emails and a second pane for displaying the content of an email selected in the email listing pane.

In another example, an operating system interface may be a multipane interface where each pane of the operating system interface is an interface for different applications. For example, an operating system for a mobile device may include different windows for different applications. In such an example, the position module 204 may determine which application the user is looking at. Similarly, a desktop operating system may include various windows for applications that are presented simultaneously, and the position module 204 may determine which window the user is looking at based on the user's eye gaze.

In certain embodiments, each pane is provided with a certain amount of viewing area for presenting content. In some embodiments, the panes may be manually resized by selecting pane boundaries and dragging left/right, up/down to increase or decrease the viewing area of the pane. Thus, the position module 204 may determine whether the user is looking within the boundaries of a particular pane of an interface based on the user's eye gaze.

The resize module 206, in one embodiment, dynamically resizes an interface pane that the user is looking at in response to the position module 204 determining that the user is looking at the pane. In some embodiments, the resize module 206 enlarges the viewing area of the pane. For example, the resize module 206 may increase a visual width, height, and/or geometric area of the viewing area of the pane.

In a further embodiment, the resize module 206 enlarges the viewing area of the pane by an amount determined as a function of the viewing area allocated to the interface. For instance, the resize module 206 may enlarge the viewing area of the pane by a percentage of the allocated viewing area for the pane and/or the interface. For example, if a pane is allocated 30% of the viewing area of the entire interface, the resize module 206 may enlarge the pane until the viewing area of the pane is at 30% of the viewing area of the entire interface.

Similarly, the resize module 206 may enlarge the viewing area of a pane until a certain ratio is met. In one embodiment, the ratio may be a ratio of the viewing area allocated to the pane or the interface to the size of the display that is presenting the interface. For example, if the display has a resolution of 1920×1080 and the interface is given 75% of the viewing area, then the resize module 206 may maintain the 75% viewing area ratio for the pane of the interface.

In another embodiment, the resize module 206 enlarges the viewing area of a pane as a factor of the allocated viewing area of the pane and/or the interface. For example, the resize module 206 may enlarge the viewing area of the pane up to 50% of the total viewing area of the interface. Thus, if the interface gets larger or smaller, the resize module 206 will resize the viewing area of the pane to be at 50% of the viewing area of the interface.

In some embodiments, the resize module 206 enlarges the viewing area of a pane until the content in the pane is fully visible to the user. For example, if the email display pane of an email application cannot display the entire contents of an email (e.g., text, images, etc.) such that the user has to scroll horizontally or vertically to see the email contents, the resize module 206 may enlarge the pane until the content is visible without scrolling.

In this manner, based on the foregoing resizing methods, the resize module 206 may not enlarge the pane or the interface beyond a default or predetermined setting. In other words, the resize module 206 may not enlarge or maximize the display beyond a predetermined limit.

In certain embodiments, the position module 204 detects the user's eye gaze move from a first pane to a second pane of a multipane interface. In such an embodiment, the resize module 206 may enlarge the viewing area of the second pane while simultaneously reducing the size of the viewing area of the first pane. For instance, the position module 204 may detect when the user's eye gaze moves from within the boundaries of the first pane, and crosses over the boundary between the first and second panes, and into the second pane.

The timing module 208, in one embodiment, starts a timer in response to determining that the user is looking at a pane within the interface. When the timing module 208 detects that the timer has expired, then the resize module 206 may dynamically resize the pane. For example, the timer may be set to 0.5 seconds so that after the user has been looking at a pane for 0.5 seconds, then the resize module 206 may resize the pane that the user is looking at. In certain embodiments, the timing module 208 resets the timer in response to the tracking module 202 and/or the position module 204 detecting that the user's eye gaze moved from the pane that the user is currently looking at to a different pane prior to expiration of the timer.

For example, if the position module 204 determines that the user is looking at a first pane, the timing module 208 may start a timer for 0.5 seconds. However, if the position module 204 then determines that the user is looking at a different pane, then the timer will reset to 0.5 seconds and the resize module 206 may resize the pane that the user is currently looking at when the timer expires. In this manner, if the tracking module 202 detects that the user's eye gaze is moving quickly back-and-forth, or around the interface, or the like, the timing module 208 can prevent the constant resizing of interface panes by starting and resetting a timer, and only triggering the resize module 206 when the timer expires.

Figure 3:
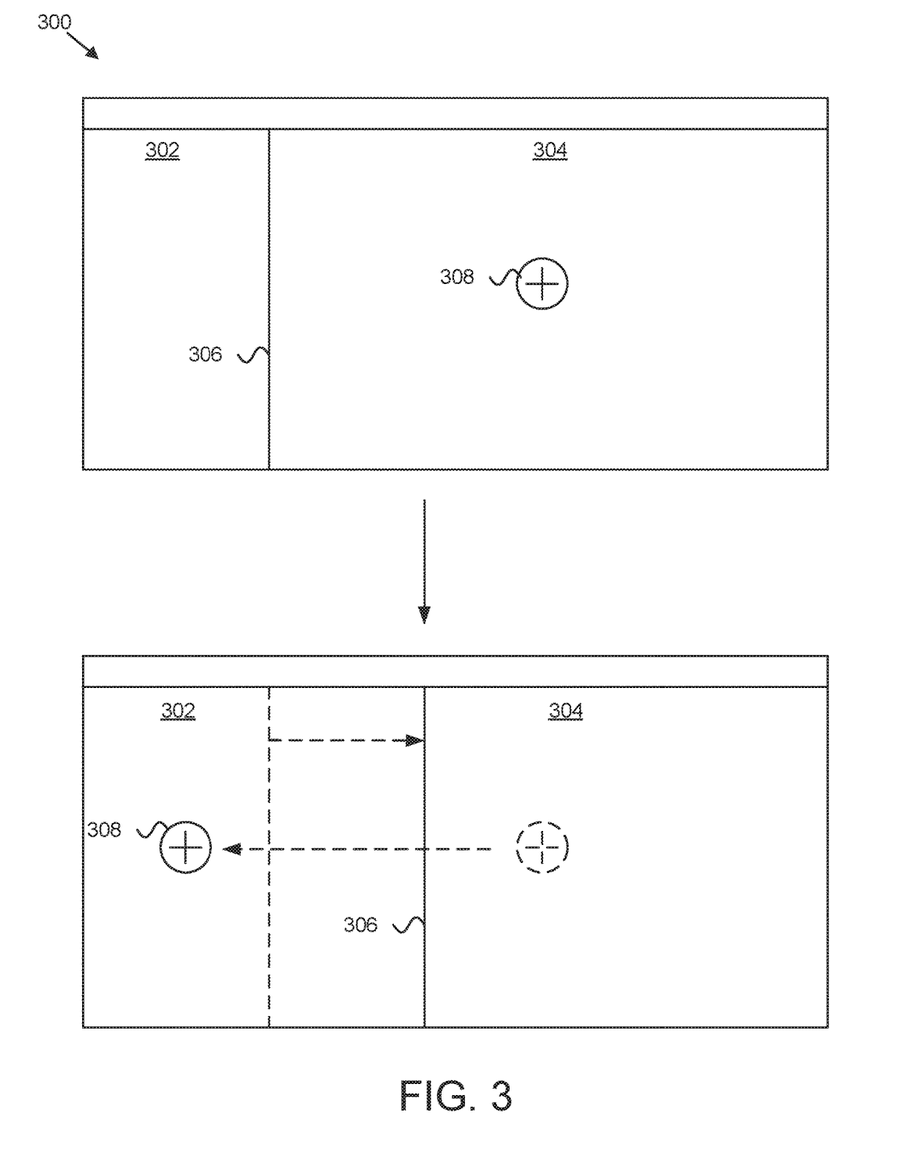
FIG. 3 is a schematic block diagram illustrating one embodiment of an interface in accordance with the subject matter disclosed herein.

FIG. 3 is a schematic block diagram illustrating one embodiment of an interface 300 for resizing interfaces based on eye gaze. In one embodiment, the interface 300 includes a first pane 302, a second pane 304, and a boundary 306 between the first pane 302 and the second pane 304. In one embodiment, the position module 204 may determine a position 308 of the user's eye gaze, which in the depicted embodiment is located in the second pane 304 meaning the user is looking at the second pane 304.

In one embodiment, if the tracking module 202 detects movement in the user's eye gaze, and the position module 304 determines that position 308 of the user's eye gaze indicates that the user is now looking at the first pane 302, then the resize module 206 may enlarge the first pane 302 by dynamically moving the boundary 306 to the right, which simultaneously decreases the size of the second pane 304.

Figure 4:
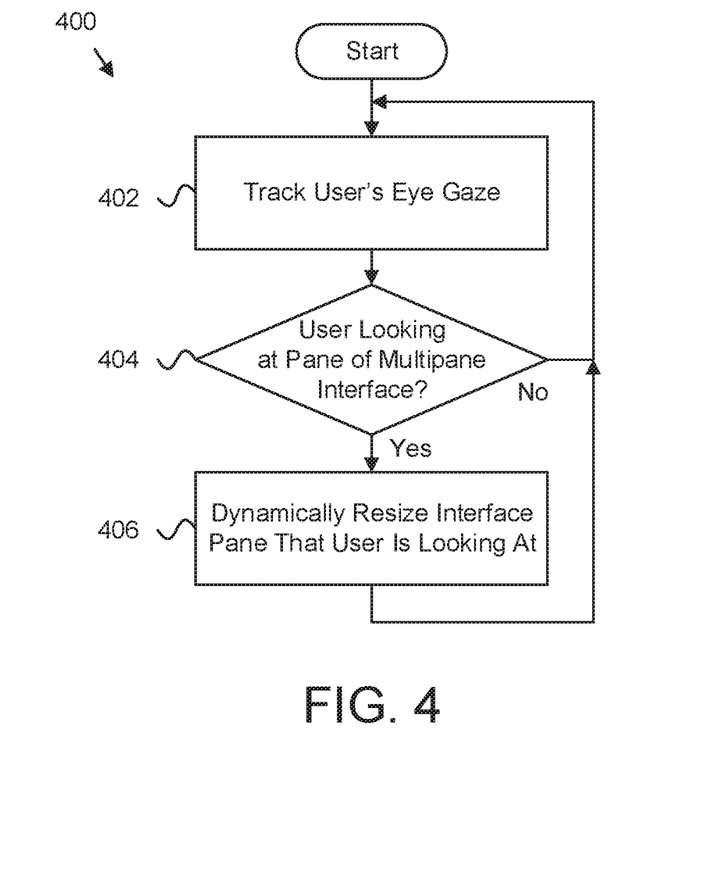
FIG. 4 is a schematic flow chart diagram illustrating one embodiment of a method for resizing interfaces based on eye gaze.

FIG. 4 is a schematic flow chart diagram illustrating one embodiment of a method 400 for resizing interfaces based on eye gaze. In one embodiment, the method 400 begins and the tracking module 202 tracks 402 a user's eye gaze using an eye tracking sensor. In a further embodiment, the position module 206 determines 404 whether the user is looking at a pane of a multipane interface based on the user's eye gaze. If not, the tracking module 202 continues tracking 402 the user's eye gaze. Otherwise, the resize module 206 dynamically resizes 406 the pane that the user is looking at in response to determining that the user is looking at the pane, and the tracking module 202 continues tracking 402 the user's eye gaze.

Figure 5:
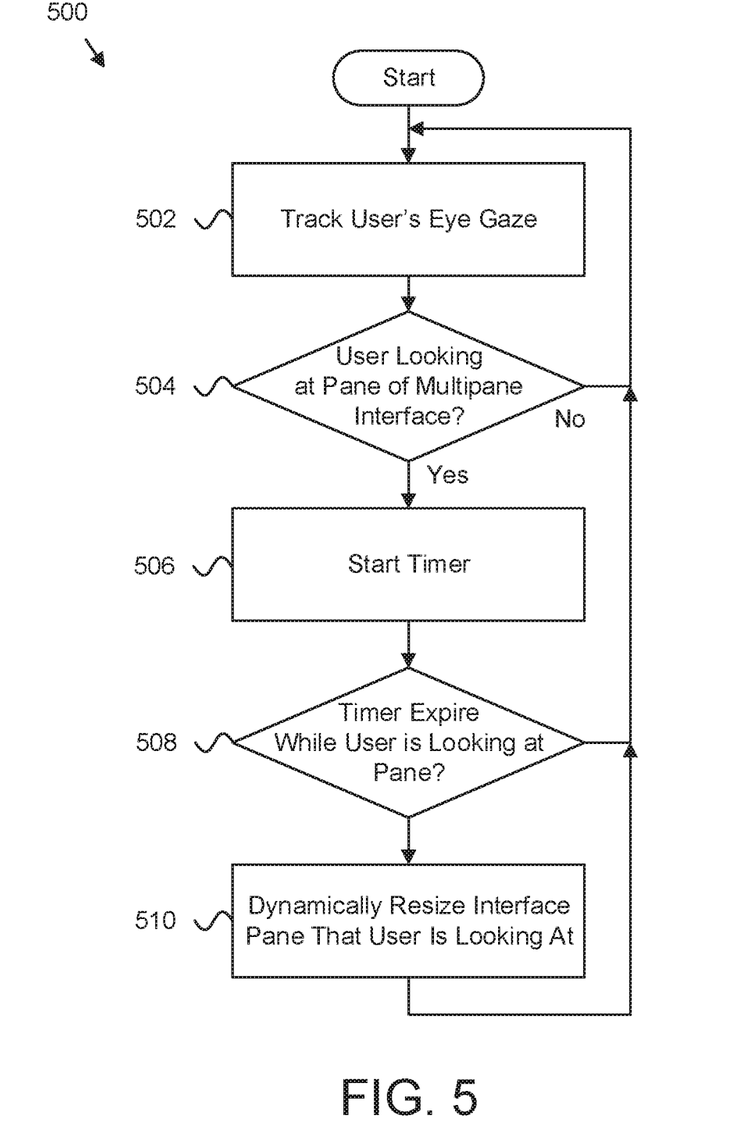
FIG. 5 is a schematic flow chart diagram illustrating one embodiment of another method for resizing interfaces based on eye gaze.

FIG. 5 is a schematic flow chart diagram illustrating one embodiment of another method 500 for resizing interfaces based on eye gaze. In one embodiment, the method 500 begins and the tracking module 202 tracks 502 a user's eye gaze using an eye tracking sensor. In a further embodiment, the position module 206 determines 504 whether the user is looking at a pane of a multipane interface based on the user's eye gaze. If not, the tracking module 202 continues tracking 502 the user's eye gaze.

Otherwise, in one embodiment, the timing module 208 starts 506 a timer in response to determining that the user is looking at the pane. In certain embodiments, the timing module 208 determines 508 whether the timer expired while the user was looking at the pane. If not, the tracking module 202 continues tracking 502 the user's eye gaze. Otherwise, if the timing module 208 determines 508 that the timer has expired, then the resize module 206 dynamically resizes 510 the pane that the user is looking at in response to determining that the user is looking at the pane, and the tracking module 202 continues tracking 502 the user's eye gaze.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a display device;
an eye tracking sensor;
a processor;
a memory that stores code executable by the processor to:
track a user's eye gaze using the eye tracking sensor while the user is looking at a multipane interface for an application that is graphically presented on the display device, the multipane interface comprising a plurality of interface panes that graphically divide content presented within the multipane interface;
determine that the user's eye gaze is positioned within a viewing area of a pane of the plurality of panes of the multipane interface based on eye gaze tracking input from the eye tracking sensor, the viewing area of the pane comprising a graphical area for presenting content within the pane based on boundaries that define the pane within the multipane interface; and
dynamically resize the viewing area of the pane where the user's eye gaze is positioned by changing a location of one or more of the boundaries that define the pane in response to determining that the user's eye gaze is positioned within the viewing area of the pane.

2. The apparatus of claim 1, wherein the code is further executable by the processor to dynamically resize the pane by enlarging a viewing area of the pane within the multipane interface.

3. The apparatus of claim 2, wherein the code is further executable by the processor to enlarge the viewing area of the pane by increasing a width of the pane.

4. The apparatus of claim 2, wherein the code is further executable by the processor to enlarge the viewing area of the pane by increasing a height of the pane.

5. The apparatus of claim 2, wherein the code is further executable by the processor to enlarge the viewing area of the pane by increasing a geometric area of the viewing area of the pane.

6. The apparatus of claim 2, wherein the code is further executable by the processor to enlarge the viewing area of the pane by an amount determined as a function of the viewing area allocated to the multipane interface.

7. The apparatus of claim 6, wherein the code is further executable by the processor to enlarge the viewing area of the pane by one or more of a percentage of the allocated viewing area, a ratio of the allocated viewing area to a size of a display presenting the multipane interface, and a factor of the allocated viewing area.

8. The apparatus of claim 1, wherein the code is further executable by the processor to:
detect the user's eye gaze move from the pane to a second pane of the multipane interface; and
dynamically resize the second pane in response to detecting the user's eye gaze move from the first pane to the second pane.

9. The apparatus of claim 8, wherein the code is further executable by the processor to dynamically reduce a viewing area of the pane in response to detecting the user's eye gaze move from the pane to the second pane.

10. The apparatus of claim 1, wherein the code is further executable by the processor to start a timer in response to determining that the user is looking at the pane, wherein expiration of the timer triggers the dynamic resizing of the pane.

11. The apparatus of claim 10, wherein the code is further executable by the processor to reset the timer in response to detecting the user's eye gaze move from the pane to a second pane prior to expiration of the timer.

12. The apparatus of claim 1, wherein the multipane interface comprises an operating system interface, and wherein each pane of the operating system interface comprises an interface for an application executing within the operating system.

13. A method comprising:
tracking a user's eye gaze using an eye tracking sensor while the user is looking at a multipane interface for an application that is graphically presented on a display device, the multipane interface comprising a plurality of interface panes that graphically divide content presented within the multipane interface;
determining, by a processor, that the user's eye gaze is positioned within a viewing area of a pane of the plurality of panes of the multipane interface based on eye gaze tracking input from the eye tracking sensor, the viewing area of the pane comprising a graphical area for presenting content within the pane based on boundaries that define the pane within the multipane interface; and dynamically resizing the viewing area of the pane where the user's eye gaze is positioned by changing a location of one or more of the boundaries that define the pane in response to determining that the user's eye gaze is positioned within the viewing area of the pane.

14. The method of claim 13, further comprising dynamically resizing the pane by enlarging a viewing area of the pane within the multipane interface.

15. The method of claim 13, further comprising enlarging the viewing area of the pane by increasing one of a width, a height, and a geometric area of the viewing area of the pane.

16. The method of claim 13, further comprising:
detecting the user's eye gaze move from the pane to a second pane of the multipane interface; and
dynamically resizing the second pane in response to detecting the user's eye gaze move from the first pane to the second pane.

17. The method of claim 16, further comprising dynamically reducing a viewing area of the pane in response to detecting the user's eye gaze move from the first pane to the second pane.

18. The method of claim 13, further comprising starting a timer in response to determining that the user is looking at the pane, wherein expiration of the timer triggers the dynamic resizing of the pane.

19. The method of claim 13, wherein the multipane interface comprises an operating system interface, and wherein each pane of the operating system interface comprises an interface for an application executing within the operating system.

20. A program product comprising a computer readable storage medium that is not a transitory signal and that stores code executable by a processor, the executable code comprising code to perform:

tracking a user's eye gaze using an eye tracking sensor while the user is looking at a multipane interface for an application that is graphically presented on a display device, the multipane interface comprising a plurality of interface panes that graphically divide content presented within the multipane interface;

determining that the user's eye gaze is positioned within a viewing area of a pane of the plurality of panes of the multipane interface based on eye gaze tracking input from the eye tracking sensor, the viewing area of the pane comprising a graphical area for presenting content within the pane based on boundaries that define the pane within the multipane interface; and dynamically resizing the viewing area of the pane where the user's eye gaze is positioned by changing a location of one or more of the boundaries that define the pane in response to determining that the user's eye gaze is positioned within the viewing area of the pane.

* * * * *